H. M. RICHARDSON.
CLEANING MACHINE.
APPLICATION FILED JULY 14, 1917.
1,267,905.
Patented May 28, 1918.
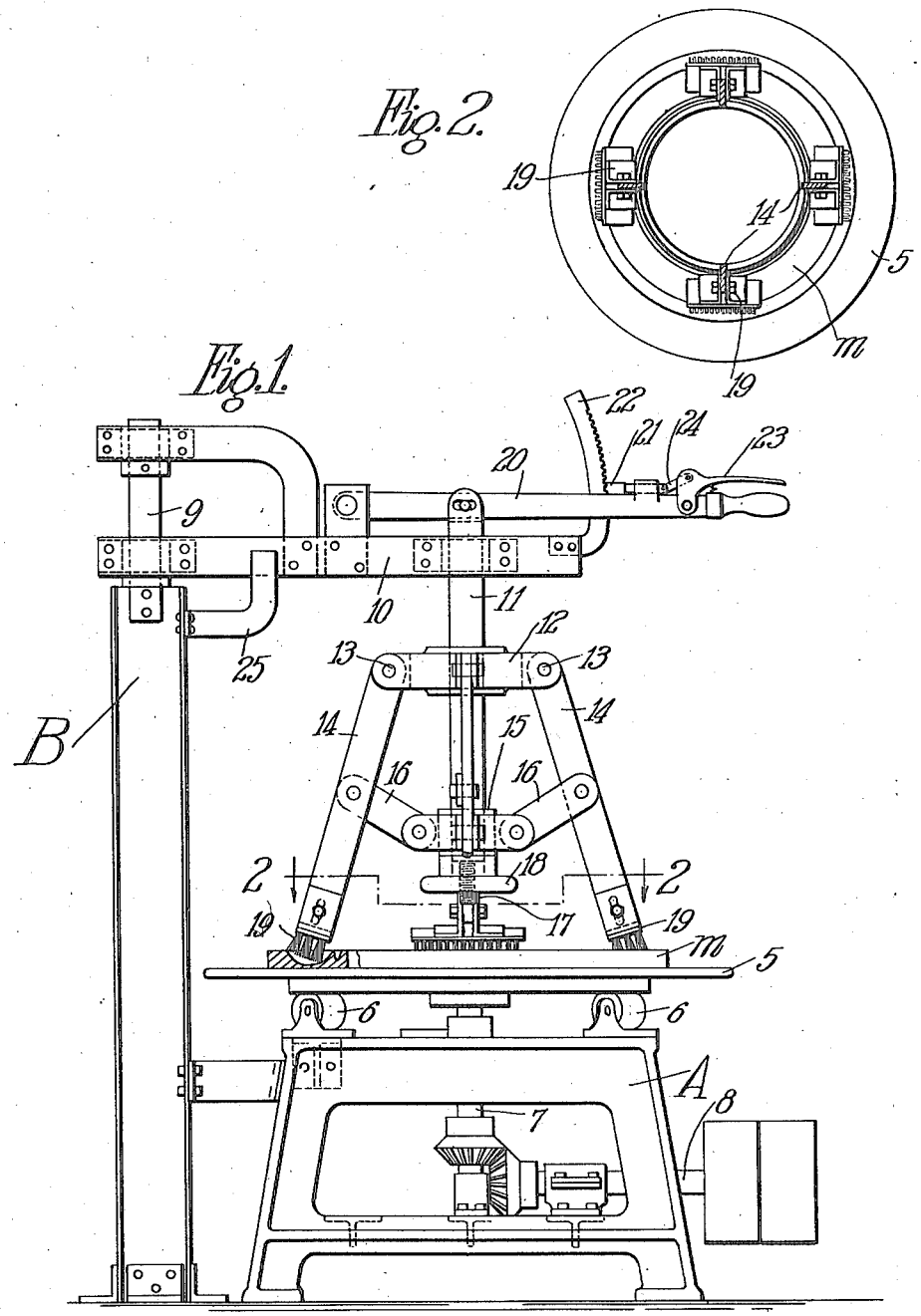

UNITED STATES PATENT OFFICE.

HAROLD M. RICHARDSON, OF CHICOPEE FALLS, MASSACHUSETTS.

CLEANING-MACHINE.

1,267,905.   Specification of Letters Patent.   Patented May 28, 1918.

Application filed July 14, 1917. Serial No. 180,590.

*To all whom it may concern:*

Be it known that I, HAROLD M. RICHARDSON, a citizen of the United States of America, residing at Chicopee Falls, in the county of Hampden and State of Massachusetts, have invented certain new and useful Improvements in Cleaning-Machines, of which the following is a specification.

This invention relates to cleaning machines and more particularly to machines which are adapted to cleaning circular surfaces of articles, such for example, as tire molds and the like.

The invention has for its object to provide a cleaning machine wherein the article to be cleaned may be rapidly revolved in engagement with a plurality of cleaning tools, such as brushes for example, and is characterized by means whereby all the tools may be simultaneously and uniformly spread out or drawn together in a radial direction with respect to the article to be cleaned, together with improved and conveniently operable devices to move the brushes to and from the articles.

Other objects and advantages will appear in the following description and will be particularly pointed out in the appended claims.

The invention, in an embodiment at present preferred, is shown for illustrative purposes in the accompanying drawings, in which:

Figure 1 is an elevational view of a cleaning machine embodying the invention; and Fig. 2 is a sectional plan view taken on the line 2—2 of Fig. 1.

Referring to these drawings, in detail; A represents a suitable supporting frame upon which a circular table 5 is rotatably mounted, preferably by roller bearings 6 as indicated. Fixed at its upper end to the table 5 is a vertical shaft 7, which is rotatably mounted in frame A and is connected by the bevel gears shown to a horizontal shaft 8. The latter is adapted to be driven from a suitable source of power to rotate the table 5, and, upon the latter, the articles to be cleaned, in this instance, circular articles *m*, are suitably supported.

Loosely mounted on a vertical shaft 9, supported above and to one side of table 5 by a suitable frame B, is an arm 10 capable of being swung freely in a horizontal plane. Vertically slidable but not rotatable in arm 10 is a rod 11 and fixed thereon is a collar 12. Pivoted at 13 to the latter are a plurality of arms 14, which are arranged in equally spaced relation about the periphery of member 12. Slidable on rod 11 below the latter is a collar 15, which is connected to each of the arms 14 by pivoted links 16. The lower end 17 of rod 11 is necked down and provided with a screw thread to receive an internally threaded hand wheel 18. By turning the latter, collar 15 may be raised or lowered and, by raising and lowering the collar, arms 14 may be spread apart and drawn together respectively. Adjustably mounted on the lower ends of arms 14 by the bolt and slot connection shown are brushes 19, the bristles of which are preferably of hair, wire, or the like. The bolt and slot connection described not only permits the brushes 19 to be adjusted up and down the arm but also angularly as well so that the brushes may be brought to bear in any desired manner on any particular surface of mold *m*.

Pivoted at one end to arm 10 is a lever 20 which has a pin and slot connection as indicated in Fig. 1, with the vertically slidable rod 11. Slidably mounted on lever 20 is a dog 21 adapted to engage in any of the teeth in a segment 22 secured to the end of arm 10 and upstanding therefrom. Pivoted to lever 20 and spring pressed upwardly therefrom is a bell crank lever 23 which is connected to dog 21 by a link 24, in such a manner that the dog is normally held in engagement with segment 22. By depressing bell crank 23, lever 20 is released from locking engagement with segment 22 and may be raised and lowered as desired to raise or lower brushes 19 with respect to the article *m* to be cleaned. The articles to be cleaned are circular in shape, such for example, as tire molds. In order to conveniently aline rod 11 with the center of the table 5 so that the brushes will probably fit within mold *m*, as indicated, a stop 25, is secured to frame B and has a part located in the path of arm 10, whereby when the latter is swung into engagement with the stop the axes of shaft 11 and table 5 are exactly alined.

In operation, the molds *m* or other circular articles to be cleaned, are suitably mounted and centered on table 5 and the latter is rotated by the driving connections described. Arm 10 is swung until it abuts stop 25 and is held in abutment therewith, the handle of lever 20 serving as a convenient means to move the arm. The latter is then released from segment 22 by depressing lever 23 and is thereafter lowered to bring the brushes 19 into engagement with the rotating mold *m*. The pressure of the brushes on the mold may be varied as desired by the operator by raising or lowering lever 20 and the latter may be automatically locked in any desired position by dog 21 as soon as the pressure on lever 23 is relaxed. The mold *m* being rotated at high speed while in engagement with brushes 19 may thus be rapidly and effectively cleaned.

The cleaning machine is particularly advantageous for cleaning articles having circular surfaces, such as the molds used in vulcanizing tire shoes, for example. The machine is so designed that heavy articles may be cleaned therein for the arm 10 carrying the entire cleaning devices therewith may be swung out of the way to permit articles, carried on an overhead trolly for instance, to be carried over the table and lowered into place thereon. It is also to be noted that due to the radial adjustability of the brushes, surfaces much wider than the brushes may be cleaned, for the brushes may be moved radially outward or inward through a considerable range to reach all parts of the surface. In this connection, the adjustable mounting of the brushes 19 on arms 14 is important as it permits variation in the angle at which the brushes engage the work as well as extension or retraction of the brushes relatively to their arms. Particularly with articles wherein the circular surface to be cleaned is set into the article and, in cross sectional contour, is made up of many curves of varying radii, as in the tire mold illustrated, the angular and radial adjustment of the brushes permits every nook, recess and corner of the surface to be reached and effectively cleaned.

The invention has been described, in a form at present preferred, for illustrative purposes but the scope of the invention is defined by the appended claims rather than by the foregoing description.

What I claim is;

1. A cleaning machine, comprising a rotatable member to support articles to be cleaned, a supporting member movable into and out of alinement with said rotatable member, a plurality of cleaning tools carried by the supporting member and radially movable relatively thereto, means to move the supporting member axially toward and away from said rotatable member, and means to simultaneously move said tools radially toward and away from said supporting member.

2. A cleaning machine, comprising, a rotatable table adapted to support the articles to be cleaned, a swinging arm, a supporting member mounted therein, said arm adapted to be moved to bring said member into or out of alinement with said table when desired, a plurality of brush carrying arms radially arranged on said member, means to simultaneously move said arms radially with respect to said member, and means to move the latter axially toward and away from said table.

3. A cleaning machine, comprising, a rotatable table adapted to support the articles to be cleaned, a swinging arm, a supporting member mounted therein, said arm adapted to be moved to bring said member into or out of alinement with said table when desired, a plurality of arms radially arranged on said member, a brush extensibly and angularly adjustable on each of said arms, means to simultaneously move said arms radially with respect to said member, and means to move the latter axially toward and away from said table.

4. A cleaning machine, comprising, a rotatable table adapted to support the articles to be cleaned, a swinging arm, a supporting member mounted therein, said arm adapted to be moved to bring said member into or out of alinement with said table when desired, a plurality of brush carrying arms radially arranged on said member, means to simultaneously move said arms radially with respect to said member, means to move the latter axially toward and away from said table, and means associated with the last named means to hold said member in the position to which it is moved.

5. A cleaning machine, comprising, a member to support articles to be cleaned, a second member in alinement with said first member, a plurality of arms radially arranged on the second member, a cleaning tool extensibly and angularly adjustable on each of said arms, means to simultaneously move said arms radially with respect to said second member, means to move one of said members axially toward and away from the other member, and means to rotate one of said members.

6. A cleaning machine, comprising, a member to support articles to be cleaned, a second member movable into and out of alinement with the first-named member, a radially-adjustable cleaning tool carried by the second member, means to rotate one of said members, means to move one of said members axially toward and away from the other member, and releasable means to hold the axially movable member in various positions of axial adjustment relatively to the other member.

HAROLD M. RICHARDSON.

It is hereby certified that in Letters Patent No. 1,267,905, granted May 28, 1918, upon the application of Harold M. Richardson, of Chicopee Falls, Massachusetts, for an improvement in "Cleaning-Machines," an error appears in the printed specification requiring correction as follows: Page 1, line 100, for the word "probably" read *properly;* and that the said Letters Patent should be read with this correction therein that the same may conform to the record of the case in the Patent Office.

Signed and sealed this 25th day of June, A. D., 1918.

[SEAL.]

R. F. WHITEHEAD,

*Acting Commissioner of Patents.*

Cl. 15—8.